United States Patent [19]
Sato et al.

[11] Patent Number: 4,579,438

[45] Date of Patent: Apr. 1, 1986

[54] FOCUSING DEVICE

[75] Inventors: Yuichi Sato; Tokuichi Tsunekawa; Takashi Kawabata; Susumu Matsumura, all of Kanagawa, Japan

[73] Assignee: Canon Kabushiki Kaisha, Tokyo, Japan

[21] Appl. No.: 596,508

[22] Filed: Apr. 3, 1984

[30] Foreign Application Priority Data

Apr. 4, 1983 [JP] Japan ................................ 58-59602

[51] Int. Cl.$^4$ .............................................. G03B 3/10
[52] U.S. Cl. .................................................. 354/403
[58] Field of Search ................ 354/400, 402, 403, 404

[56] References Cited

U.S. PATENT DOCUMENTS 4,065,778 12/1977 Harvey ................................ 354/403
4,429,965 2/1984 Enomoto et al. .................... 354/402
4,473,743 9/1984 Ishikawa .............................. 354/402

Primary Examiner—Russell E. Adams
Attorney, Agent, or Firm—Toren, McGeady, Stanger, Goldberg & Kiel

[57] ABSTRACT

A focusing device for focusing a photographic camera or the like on the image of an object to be photographed is arranged to control and adjust the operating time of each performance of a focus detecting process according to a signal produced from reflection light receiving means during a series of processes. These processes include projecting a light on the object, receiving a reflection light from the object, computing an extent of deviation of a photo-taking lens from an in-focus position on the basis of a signal produced from a light receiving device; and driving the lens to shift its position.

5 Claims, 13 Drawing Figures

FOCUSING DEVICE

BACKGROUND OF THE INVENTION

1. Field of the Invention

This invention relates to a focusing device which focuses an object image on an imaging plane by controlling a photo-taking lens state and, more particularly, to a device for controlling the length of operating time of each of focusing operation processes.

2. Description of the Prior Art

Many focusing devices are known which are arranged to perform a focusing operation through the processes of receiving by light receiving means a reflection light from an object to be photographed, determining an extent of deviation of a photo-taking optical system from an in-focus position thereof on the basis of a signal produced from the light receiving means, and shifting the position of the optical system toward the in-focus position according to the result of the determining process. In the conventional focusing devices of the above-stated kind, however, the length of time (or an operating time) for each of these focusing processes has been left uncontrolled.

Comparing, for example, a case where a detected position of a lens focused on an object greatly deviates from an in-focus position with another case where a detected focused position of the lens is relatively close to the in-focus position, a longer period of time is necessary for shifting the lens position to the in-focus position in the former case than in the latter. In the device arranged to perform a focusing operation by repeating a series of processes of receiving a light—detecting a focused state—computing an extent to which a photo-taking lens is to be shifted—shifting the lens—receiving a light again . . . , a certain length of time is required before an in-focus state is obtained by shifting the photo-taking lens in the event of deviation to a large extent from the in-focus state. In that event, in-focus state cannot be obtained by carrying out a second performance of the focusing operation immediately after the first performance. It is then necessary to wait for the lapse of a certain length of time before the start of the next performance. Conversely, in the case of a focused state close to an in-focus state, the in-focus state is obtainable by a slight shift of the photo-taking lens. In the latter case, therefore, distance measuring accuracy can be increased by starting the next performance of the focusing operation within a shorter period of time to detect a new focused state and by shifting the lens according to the newly detected focused state.

Focusing devices are also known of the kind having light emitting means and arranged to enhance focused state detecting accuracy by allowing the light emitting means to intermittently emit a light. In the case of the focusing device of this kind having light emitting means, if the light emitting means is arranged to perform light emitting and no light emitting actions with the light emission arranged to be performed in a fixed cycle, the light emission might be wastefully performed in some cases depending on the focused state. In other words, in the event of great deviation of a detected focused state from an in-focus state requiring a long period of time for shifting the photo-taking lens to an in-focus position as mentioned above, the light emission from the light emitting means during the shift of the lens is meaningless. Further, in the event of a detected focused state close to an in-focus state, the distance measuring accuracy can be increased by causing the light emitting means to emit light at an increased rate of recurrence.

SUMMARY OF THE INVENTION

A first object of the present invention is to provide a focusing device which is arranged to detect a focused state of a photo-taking optical system and to adjust the length of time required before each subsequent recurrence of a focusing operation according to a detecting signal thus obtained. More specifically, the focusing device according to the invention is provided with a control circuit which causes a time interval between one performance of a focusing operation and another is arranged to be shorter when the detected focused state of the photo-taking optical system is close to an in-focus state than when the detected focused state deviates to a great extent from the in-focus state.

A second object of the present invention is to provide a focusing device which is of the kind having intermittently and continuously light emitting means and a light receiving means for detecting the focused state of a photo-taking optical system and is provided with a control circuit for adjusting a time interval before a recurrence of the light emitting action of the light emitting means according to the focused state detected.

These and further objects and features of the invention will become apparent from the following detailed description of the preferred embodiments thereof taken in connection with the accompanying drawings.

DETAILED DESCRIPTION OF THE PREFERRED EMBODIMENTS

Figure 1A:
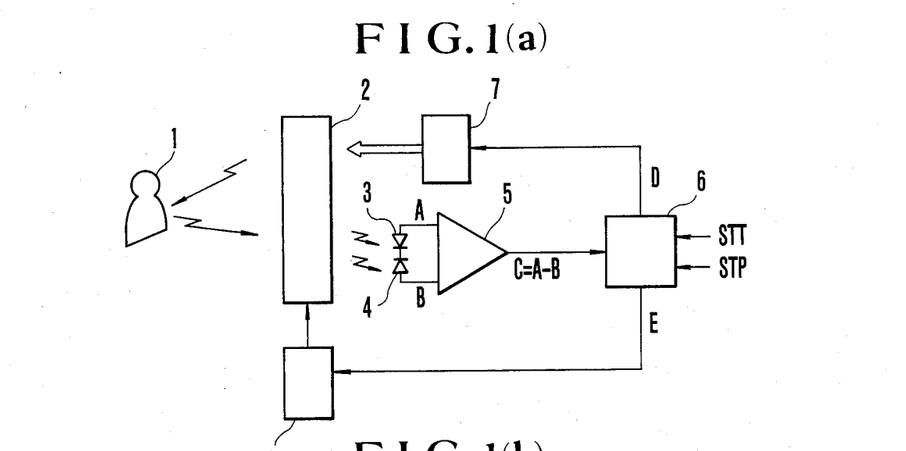
FIGS. 1(a) and 1(b) are illustrations of a focusing method to be employed according to the present invention.

FIGS. 1 through 5 are illustrations of the operating principle of the present invention. FIGS. 6(a), 6(b) and 6(c) are circuit diagrams showing the circuit arrangement of an embodiment of the invention. Referring to FIG. 1(a), the illustration includes an object 1 to be photographed; an optical system 2 including a light projecting optical system and a photo-taking optical system; first and second photo-sensitive elements 3 and 4; light quantites A and B detected at the photo-sensitive parts of the first and second photo-sensitive elements 3 and 4; amplifying means 5; and the output C of the amplifying means 5, which is a difference signal and can be expressed as follows:

$$C = A - B \tag{1}$$

The illustration further includes focusing control means 6 which is arranged to produce, from the difference signal C, a light projection control signal D and a focus control signal E for controlling the focused state of the photo-taking optical system; a light source 7 which is arranged to produce a spot-light to be projected and to have the light projecting action controlled according to the light projection control signal D; and driving means 8 for varying the focused state of the photo-taking optical system. The driving means 8 is arranged to change the focused state of the optical system according to the focus control signal E. The focused state of the photo-taking optical system can be divided into an in-focus state in which a focal plane comes to coincide with the object position; a near-focus state in which the focal plane comes closer from the object to the photo-taking optical system; and a far-focus state in which the focal plane is farther than the object relative to the optical system. In most cases, the photo-taking optical system is composed of a photo-taking lens and, in order to change the focused state, the drawn out extent of the photo-taking lens is adjusted.

Figure 1B:
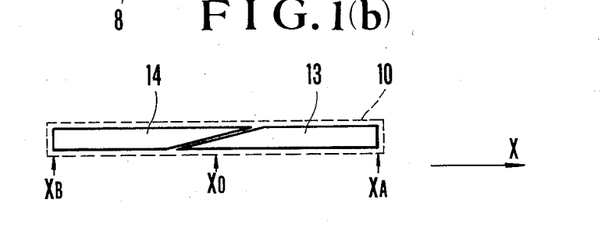

FIG. 1(b) shows, by way of example, the shape of the photo-sensitive parts of the first and second photo-sensitive elements. The illustration of FIG. 1(b) includes a light receiving part 10; the photo-sensitive part 13 of the first photo-sensitive element; and the photo-sensitive part 14 of the second photo-sensitive element. An axis x is taken in the longitudinal direction of the light receiving part 10 assuming that an origin xO is in the middle part, a coordinate xA at the end of the first photo-sensitive part and another coordinate xB at that of the second photo-sensitive part. The optical system 2 is assumed to be arranged in the following manner: A spot-light is projected via the optical system 2 on the object. An image of the projected spot-light is projected via the optical system 2 on the light receiving part 10. Then, the position of the spot-light image projected on the light receiving part varies with the focused state of the photo-taking lens. Further, an in-focus state is arranged to be obtained when the spot-light image formed on the light receiving part 10 comes to the origin xO. The position of the spot-light image formed on the light receiving part 10 is on the side of the coordinate xA when there obtains a far-focus state and is on the side of the coordinate xB in the event of a near-focus state.

Figure 2:
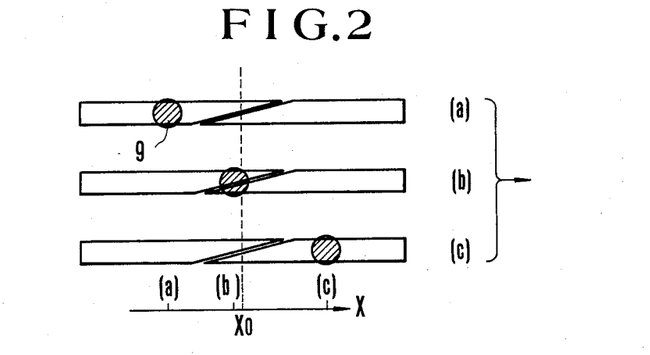
FIG. 2 is an illustration showing a spot-light image formed on a light receiving part arranged according to the invention.

In FIG. 2, a part (a) of the illustration represents a near-focus state; a part (b) represents another near-focus state which is close to an in-focus state; another part (c) represents a far-focus state. FIG. 2 thus shows the varied positions of the spot-light image formed on the light receiving part 10.

Figure 3:
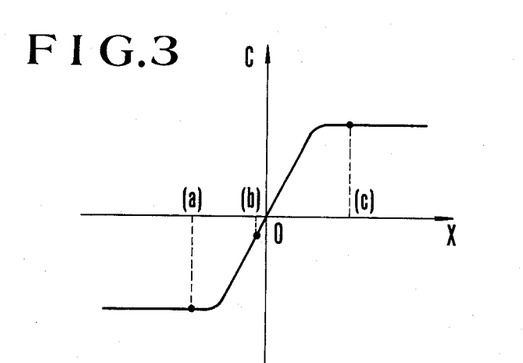
FIG. 3 is a graph showing the relation of the position of the spot-light image to a signal output obtained according to the invention.

FIG. 3 shows the coordinates x of the center of the spot-light image 9 obtained when the image 9 moves on the light receiving part 10 in relation to changes taking place in the difference C between the outputs A and B of the first and second photo-sensitive parts. The difference C shows the magnitude and direction of the position coordinate x within a region in the proximity of a point O and the direction thereof in the region where the coordinate x is of a large value. The difference C thus can be considered representative of information on the position of the spot-light image 9.

In order to bring the photo-taking lens closer to an in-focus state, the position coordinate x of the spot-light image 9 must be brought closer to the middle point xO. For this purpose, the degree of deviation of the drawn out extent of the photo-taking lens from an in-focus position is predicted or estimated from the difference C which is the information on the position of the above-stated spot-light image 9. Then, the photo-taking lens is driven according to the predicted or estimated degree of deviation. This process of driving the photo-taking lens by estimating the deviating degree of the drawn out position of the photo-taking lens from the in-focus position on the basis of the spot-light image position information C is repeated to bring the photo-taking lens to the in-focus state. After that, a condition close to the in-focus state can be maintained by following any change in the focused state of the photo-taking lens resulting from a change in the distance between the photo-taking optical system and the object to be photographed.

Control over the drawn out extent is accomplished by controlling a lens drawing-out drive source the focused state control signal E. For example, when the drive source is DC motor or the like, the lens drawing out extent can be controlled by the length of time during which a current is impressed on the motor. Let us assume that the degree of deviation of the lens drawing-out extent from an in-focus position of the photo-taking lens is ZE and the predicted value of the deviation degree ZE obtained from the position information C is PE. Then, the signal E to be used for controlling the focused state is produced as a signal representing the magnitude of the predicted value PE at the point of time for controlling the focused state. The signal representing the magnitude of the predicted value PE is, for example, a pulse which is of a pulse width |PE| and of the same polarity as that of the value PE. When the lens drawing-out drive source is a DC motor, for example, this pulse signal E corresponds to the impression time and polarity of the current impressed on tne DC motor. When a pulse motor is to be used, the value PE corresponds to the number of pulses to be impressed on the pulse motor and the polarity of the value PE corresponds to a change-over between the forward and backward rotations of the motor. Other methods for driving the lens also can be arranged in a manner similar to this. FIG. 4(b) shows a characteristic curve obtained when the value PE is predicted or estimated from the information C. Referring to FIG. 4(b), the focused state is close to an in-focus state and the deviation value ZE is estimated to be small within a region where the absolute value of the information C is small. In this region, the deviation value ZE is considered to be approximately proportional to the position information C and the predicted value PE of the deviation degree ZE is considered to be:

$$PE \propto C \text{ (assuming that } C2 < C < C1) \tag{2}$$

Within a region where the absolute value of the information C is large (with the focused state deviating to a considerable degree from the in-focus state and the lens drawing out extent predicted or estimated to be greatly deviating from the in-focus position), the prediction or estimation error for the deviation degree ZE is considered to be great. Therefore, estimation is roughly carried out within that region and, accordingly, in the case of FIG. 4(b), it is arranged to have the following relation:

$$PE = \begin{cases} PE1 \ (C1 < C) \\ PE2 \ (C < C2) \end{cases} \quad (3)$$

This arrangement gives an advantageous effect in that the lens drawing-out degree can be prevented from being excessively controlled.

Figure 4A:
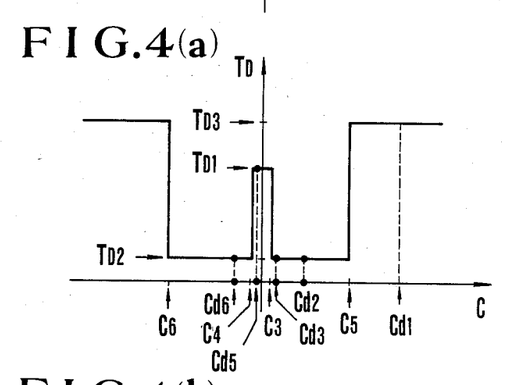
FIGS. 4(a) and 4(b) are illustrations showing the relation which obtains between time and the signal output C in carrying out focused state detection according to the invention.
Figure 4B:
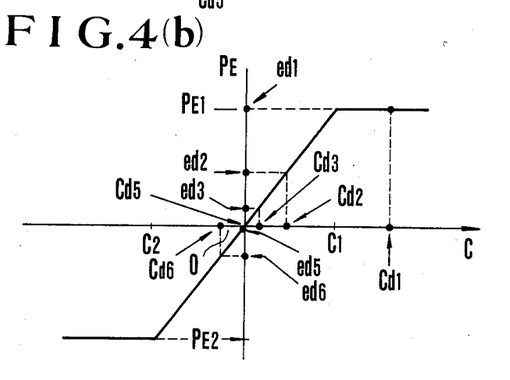

FIG. 4(a) shows a time interval TD between one performance of the focused state detecting process and another performance in relation to the position information C. When the absolute value of the position information C is great and the focused state of the photo-taking optical system is assumed to be greatly deviating from an in-focus state, it is arranged to have the following relation:

$$TD = TD3 \text{ (assuming that } C < C6 \text{ or } C5 < C) \quad (4)$$

Thus the time interval before the next performance of the focused state detecting process is arranged to be relatively long under such a condition. When the absolute value of the position information C is small and an assumed focused state of the photo-taking optical system is predicted to be close to an in-focus state, the embodiment of the invention is arranged to have the following relation:

$$TD = TD2 \ (C6 < C < C4 \text{ or } C3 < C < C5) \quad (5)$$

In that case, therefore, the time interval before the next performance of the state detecting process is arranged to be short. When the absolute value of the information C is predicted to be close to 0 and the focused state of the photo-taking optical system is assumed to be within a range allowable to be regarded as an in-focus state, the embodiment is arranged to have the following relation:

$$TD = TD1 \ (C4 < C < C3) \quad (6)$$

In this case, therefore, the time interval between the next performance of the focused state detecting process is arranged to be relatively long. In the event of a prediction that the focused state of the photo-taking optical system is deviating to a great extent from an in-focus state, the deviation degree ZE of the lens drawing-out extent is considered to be great. In that event, the prediction value PE of the deviation value ZE on which the photo-taking lens drawing-out extent is to be changed for bringing the lens closer to the in-focus position becomes great. Accordingly, a longer period of time is required in changing the drawn-out extent of the photo-taking lens in such a case. Whereas, when the focused state of the photo-taking optical system is considered to be close to an in-focus state, the deviation degree ZE is assumed to be small. Accordingly, the prediction value PE also becomes small requiring only a shorter period of time for changing the drawn-out extent of the photo-taking lens. Further, when the focused state of the photo-taking optical system is predicted to be within a range that can be regarded as an in-focus state, the focusing process can be considered to have been completed. However, when the object does not remain completely stationary, the focused state of the photo-taking optical system must be monitored or detected at suitable time intervals in order to perform focusing in pursuit of any change in the distance between the object and the photo-taking optical system. In that event, the length of time interval TD1 must be set at a suitable value.

Figures 5, 6B, 6C:
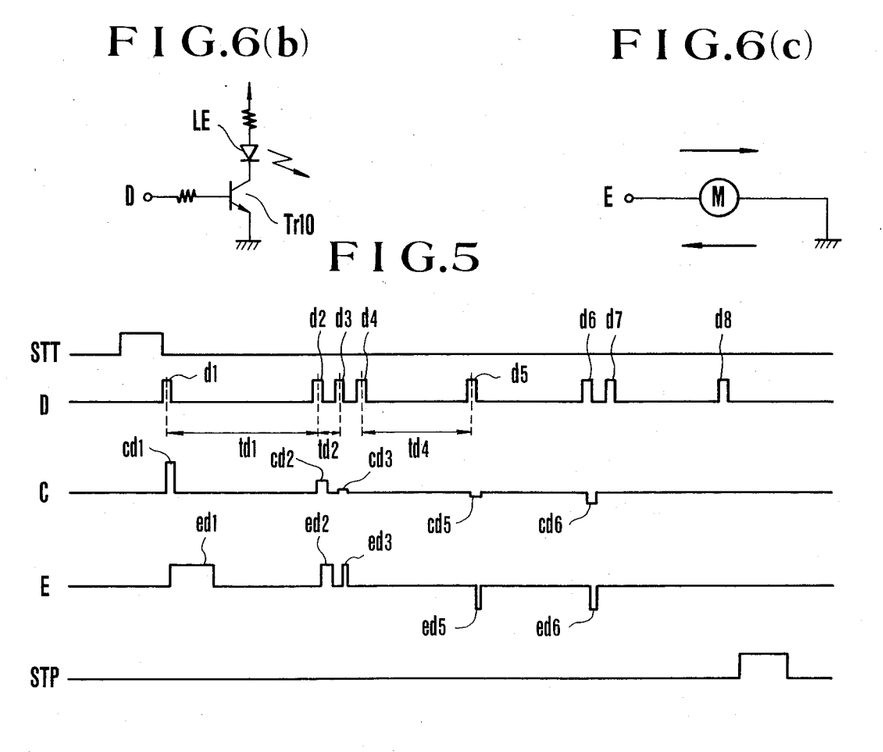
FIG. 5 is a timing chart.
FIGS. 6(a), 6(b) and 6(c) are circuit diagram showing an embodiment of the invention.
Figure 6A:
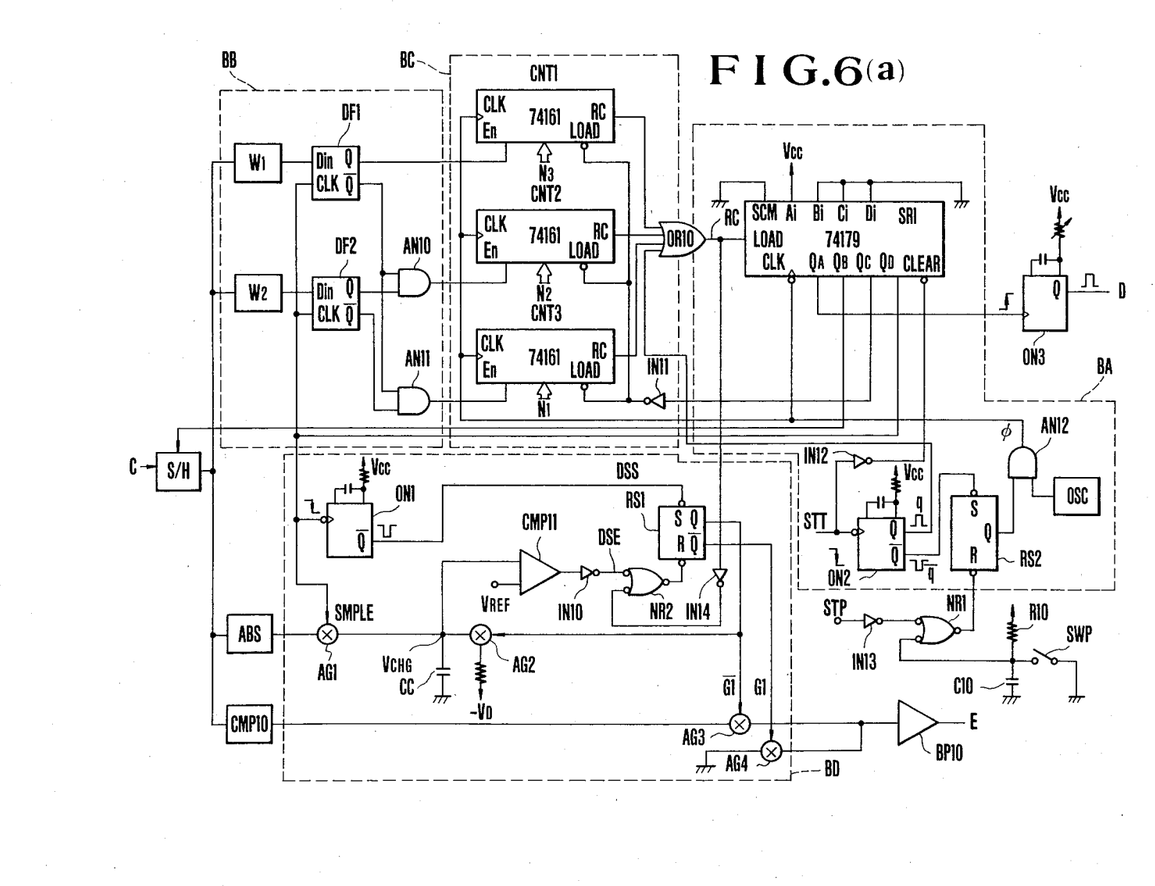

FIG. 5 is a timing chart showing by way of example the timing arrangement used for control carried out over the focused state with the characteristics shown in FIGS. 4(a) and 4(b). Upon receipt of a focusing control start signal STT, the focusing control means 6 causes a focusing operation to begin. First, a light projection signal d1 is applied to the light source 7 to cause it to light up. A spot-light is projected on the object to be photographed. This spot-light is reflected by the object and is projected on the light receiving part 10. The amplification means 5 then produces position information Cd1 on the spot-light. Since there obtains a relation Cd1 > C5, the length td1 of the first time interval TD becomes td1 = TD3. As a result, a time interval before a next light projection signal d2 is produced becomes long. A signal ed1 for controlling the drawn-out extent of the photo-taking lens is supplied to the driving means 8 to change thereby the drawn-out extent of the photo-taking lens. With the light projection signal d1 produced, the second light projection signal d2 is produced after the lapse of a period of time td1 and a second focusing process begins. A signal Cd2 is in a state of C3 < Cd2 < C5. Therefore, a time interval td2 is in a state of td2 = TD2 and is short. Accordingly, a signal ed2 also becomes small. A signal dn is an n-th light projecting signal. A signal Cdn is a difference signal representing information on the position of a spot-light image obtained for an n-th time. A signal edn is a focus control signal for controlling the focus of the photo-taking optical system and is produced for an n-th time. There is another signal Cd4 (not shown) which is in a state of Cd4 ≈ 0 and, therefore, there obtains a relation of td4 = TD1. In other words, the focusing operation has been completed at the point of time when the signal Cd4 is detected. After that, the focused state detection process is periodically repeated under the condition of tdn = TD1 as long as the focused state does not come to deviate from the range that can be regarded as an in-focus state. However, if the focused state is detected to be deviating from an in-focus state as indicated by a signal Cd6, for example, a signal ed6 is produced for readjustment of the drawn-out extent of the photo-taking lens. A signal STP is produced for bringing the focusing operation to an end. When this pulse signal STP is supplied to the focusing control means 6, the focusing operation comes to an end.

FIGS. 6(a), 6(b) and 6(c) are circuit diagrams showing a focusing device embodying the operating principle of the invention as a specific embodiment thereof.

Referring to FIG. 6(a), the embodiment includes a block BA which represents a start circuit. When a start signal STT which is produced in response to a release operation on a camera is supplied to a one-shot multivibrator ON2, one shot pulses q and $\bar{q}$ are produced from the output terminals Q and $\bar{Q}$ thereof. The pulse signal q comes to an OR gate OR10. Another pulse signal $\bar{q}$ comes to an RS flip-flop RS2. Further, the start signal STT comes via an inverter IN12 to a shift register SR1 to clear the register SR1 while the start signal STT is at a high level. The signal q of the one-shot multivibrator ON2 is supplied via an OR gate OR10 to the shift register SR1. Then, the level of the terminal load of the shift register SR1 becomes high. As a result, in synchronism with the rise of a clock pulse $\phi$ which is the output of an AND gate AN12 and is the gated signal of a signal from an oscillator OSC and a signal from the flip-flop RS2, input data Ai, Bi, Ci and Di are applied to the terminals QA, QB, QC and QD of the shift register SR1. In synchronism with the rise of a signal QA produced from the shift register SR1, a light emission control pulse signal D is produced from a one-shot multivibrator ON3. The pulse signal D turns on a transistor Tr10 of FIG. 6(b). This causes a light emitting element LE to emit a light. While the level of a pulse signal QB is changing to a high level in synchronism with the rise of a next pulse $\phi$, a sample-and-hold circuit S/H samples and holds a difference signal C representing a reflection light (C=A−B) which comes, as a result of light emission by the light emitting element, from an object to be photographed. When the level of a signal QC changes to a high level in synchronism with the rise of a next clock pulse $\phi$, counters CNT1, CNT2 and CNT3 which are arranged to control time intervals for taking signals in are loaded with preset data N3, N2 and N1 for the interval control. When a signal QD changes to a high level in synchronism with the rise of a next clock pulse $\phi$, a focused state determining circuit BB which consists of window comparators W1 and W2, D flip-flops DF1 and DF2 and AND gates AN10 and AN11 becomes operative. More specifically, when the level of the signal QD changes to a high level in synchronism with the rise of a clock pulse $\phi$, the outputs of the window comparators W1 and W2 are latched via the D flip-flops DF1 and DF2. Then, the level of the reflection light signal or difference signal C=A−B is determined via the AND gates AN10 and AN11. The reflection light which results from light emission by the light emitting means (FIG. 6(b)) is received by the above-stated light receiving means 10. Then, the difference signal C is obtained from the light receiving areas 13 and 14 by means of the operational amplifier 5 shown in FIG. 1(a). This difference signal C is supplied via the sample-and-hold circuit S/H to the window comparators W1 and W2. The output signal of the focused state determining circuit BB renders an interval time setting circuit BC operative. The window comparator W1 is arranged to produce a high level signal when the difference signal C is in a state of C>C5 and C<C6 within the range shown in FIGS. 4(a) and 4(b) and to produce a low level signal when the difference signal is in a state of C6<C<C5. The other window comparator W2 is arranged to produce a high level signal when the difference signal C is in a state of C>C3 and C<C4 and to produce a low level signal the signal C is in a state of C4<C<C3.

Figure 7:
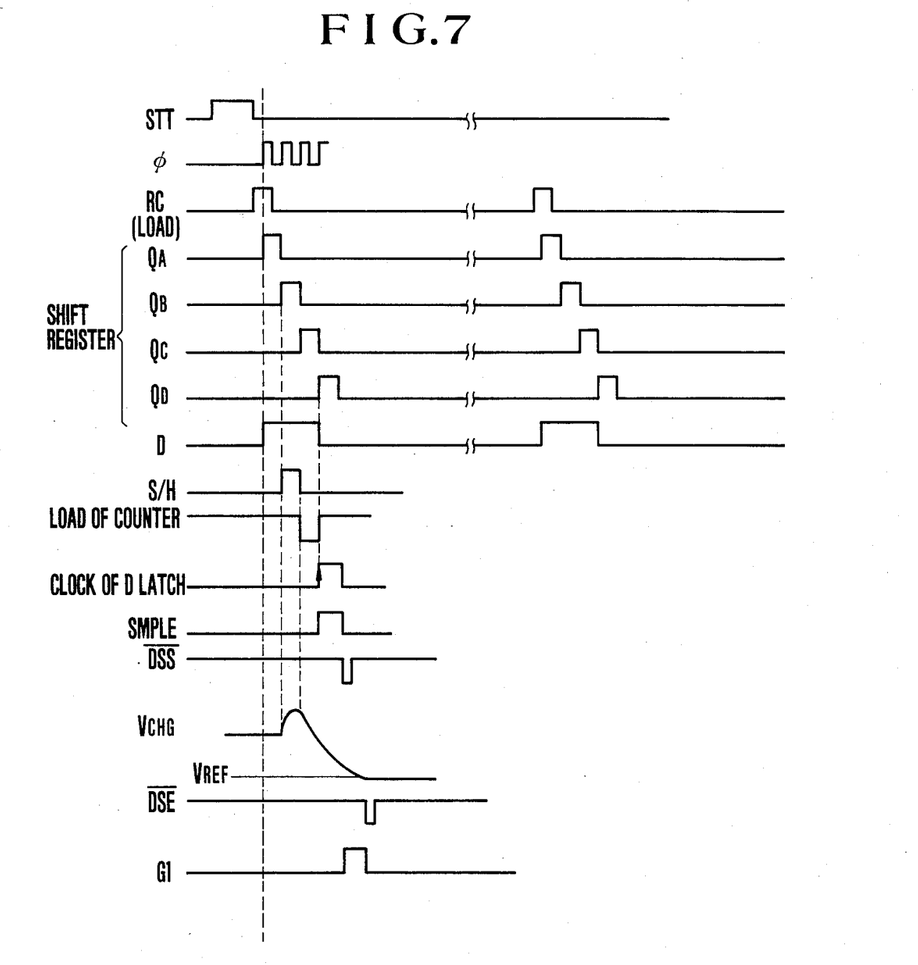
FIG. 7 is a wave form chart showing the pulse wave form of the output of each essential part of the circuit shown in FIG. 6(a).

When the position of the photo-taking lens deviates from an in-focus position to a relatively great extent, i.e. under a condition where the difference signal is in a state of C>C5 and C<C6, the window comparator produces a high level signal as mentioned above. Therefore, under that condition, the terminal Q of the flip-flop DF1 will produce a high level signal in synchronism with the rise of the output QD of the shift register SR1. This causes the level of the enabling terminal En of the counter CNT1 to become a high level. The counter thus begins to count. In this case, there is provided a relatively long period of time (TD3 of FIG. 4(a)) before commencement of the next performance of the light projection and signal receiving process. In other words, in this case, the value of the preset datum N3 of the counter CNT1 is small and a carry takes place after many pulses $\phi$ have been counted before a new signal is supplied through the OR gate OR10 to repeat the process of light projection and detection of the signal C. During the period of time before the carry output of the long time counting counter CNT1 is produced, the control circuit BD which is arranged to drive the photo-taking lens operates as follows: While the level of the output QD of the shift register SR1 is high, the analog gate AG1 is opened to allow an absolute value signal obtained from the signal held at the sample-and-hold circuit S/H to be stored at a capacitor CC via an absolute value obtaining circuit ABS which produces (a signal SAMPLE as shown in FIG. 7). A comparator CMP10 receives the signal from the above-stated sample-and-hold circuit S/H and produces, according to the difference signal C, a determination signal indicative of whether the position of the object image is in a near-focus state or in a far-focus position relative to an in-focus position. The one-shot circuit ON1 produces a one-shot pulse DSS in response to the rise of the output QD of the shift register SR1. This pulse DSS sets an RS flip-flop RS1. The flip-flop RS1 then produces a high level signal $\overline{G1}$ from its terminal Q to turn on analog gates AG2 and AG3. With the analog gate AG3 turned on, the determination signal produced from the comparator CMP10 is supplied to a buffer circuit BP10 to cause it to produce a driving signal E for operating a motor M which is arranged to drive the photo-taking lens as shown in FIG. 6(b). Meanwhile, with the analog gate AG2 also turned on together with the analog gate AG3 by the set signal applied to the flip-flop RS1, an electric charge stored at the capacitor CC is discharged. The terminal voltage VCHG of the capacitor CC is compared with a reference voltage Vref by a comparator CMP11. When the terminal voltage or signal VCHG becomes lower than the reference voltage, an inverter IN10 and a gate NR2 produce a reset signal to reset the flip-flop RS1. With the flip-flop thus reset, the analog gates AG2 and AG3 are turned off and another analog gate AG4 is turned on. Among the interval control counters CNT1–CNT3, the counter CNT1 is selected by a signal produced from the above-stated focused state determining circuit. When a carry signal is produced upon completion of the count of the counter CNT1, the output of an OR gate OR10 is supplied via an inverter 14 to the gate NR2 to initially reset the flip-flop RS1. With the flip-flop RS1 thus reset, the analog gate AG4 is turned on to bring the lens driving motor M to a stop.

In the cycle of operation described above, the start signal STT causes the one-shot circuit ON2 to produce the one-shot pulse q. The one-shot pulse q causes the shift register SR1 to operate. After that, the one-shot circuit ON3 is caused to produce light emission signal D by the signal QA. With the light emitted, a reflection light is received by the light receiving means 10. The amplification means 5 produces the difference signal C. Then, the focused state determining circuit performs the determining operation according to the difference signal C. In response to the determining operation, the interval control counter which is arranged to control the interval at which the light emission is to be effected determines the length of the time interval before next light emission. Further, the photo-taking lens driving control time is determined by the opening and closing control performed over the analog gates AG2 and AG3 according to the magnitude of the signal ABS which is obtained by making a sampled and held signal into an absolute value.

When the photo-taking lens is in the above-stated condition deviating from an in-focus position, the light emission by the light emitting means is performed at the light emitting interval td1 as shown by the wave form D of the chart of FIG. 5. Meanwhile, the motor M is driven for a long period of time ed1. Accordingly, with the position of the photo-taking lens deviating to a great extent from an in-focus position, light emission is effected at a long time interval and a sampling time interval at which the focused state is detected, from the reflection light of the object received by the light receiving means also becomes long. When the position of the photo-taking lens is fairly close to the in-focus position and the difference signal is in a state of C3<C<C5 and C6<C<C4, the window comparator W1 produces a low level signal and the other window comparator W2 a high level signal. Therefore, the level of the output $\overline{Q}$ of the flip-flop DF1 and that of the output Q of the flip-flop DF2 become high. This causes, via the AND gate AN10, the level of the terminal En of the counter CNT2 to become high and the counter CNT2 begins to count. In this case, the preset datum N2 of the counter is of a large value and a carry signal is produced after a small number of pulses $\phi$ are counted. Then, the counter is loaded with a new signal via the OR gate OR10. Therefore, the light emitting means performs light emission at the time interval td2 shown at the wave form D in FIG. 5 and the motor M is also driven for a short period of time as indicated by ed2 in FIG. 5.

Further, when the position of the photo-taking lens is close to an in-focus position and the difference signal C of the light receiving means is in a state of C4<C<C3, both the window comparators W1 and W2 produce low level signals. The levels of the outputs $\overline{Q}$ of the flip-flops DF1 and DF2 become high to cause the level of the terminal En of the counter CNT3 to become high via the AND gate AN11. The counter CNT3 begins to count. In this case, the preset datum N1 of the counter is of a medium value. The counter produces a carry signal after counting a medium number of the pulses $\phi$ and then is loaded with a new signal via the OR gate OR10. After that, the light emitting and detecting processes are resumed in a repeating manner. Under this condition, the time interval for light emission by the light emitting means is set at a long length of time as indicated by td4 in FIG. 5.

In the embodiment described, the time interval before a next performance of the focused state detecting operation is arranged to be long when the absolute value of the difference signal C produced from the light receiving sensor consisting of two photo-sensitive parts is large and is arranged to be short when the absolute value is small. Therefore, with the time interval adjustend to a suitable length for the next performance of the focused state detecting operation when the value of C is close to zero, the focusing operation can be completed through a relatively small number of repeated performances of the focused state detecting operation without requiring complex sensor arrangement. When a focusing operation is to be performed on a photo-taking optical system by continuously detecting the focused state of the optical system, the inventive arrangement permits relatively quick focusing with the number of focused state detecting performances reduced to a small number of times. The embodiment also saves the energy required for light projection and for driving the phototaking optical system.

In the embodiment shown in FIG. 6(a), when a focusing operation has been completed, a focusing operation ending signal STP is produced to reset the RS flip-flop RS2 via a gate NR1. With this signal produced, the operation of the circuit arranged as shown in FIG. 6(a) comes to a stop. Further, a switch SWP is arranged to close in response to a release operation performed on a camera (not shown). With this switch SWP closed, the flip-flop RS2 is reset via the gate NR1 after the lapse of a period of time determined by a capacitor C10 and a resistor R10. With the flip-flop RS2 reset in this manner, the whole circuit arrangement assumes an initial state.

Figure 8A:
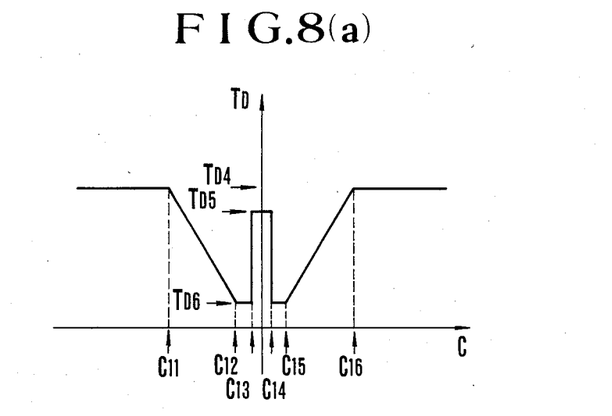
FIGS. 8(a) and 8(b) are illustrations showing the focused state detecting operation of another embodiment of the invention.
Figure 8B:
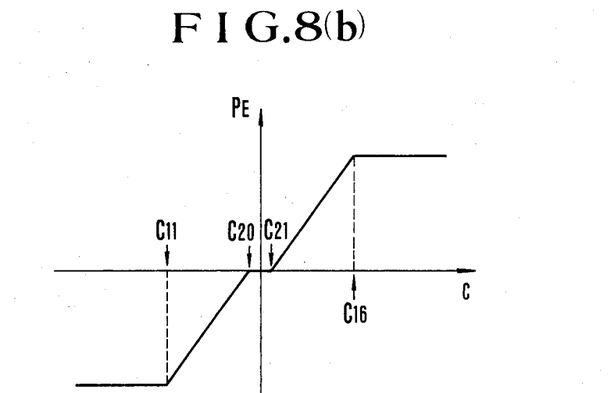

FIGS. 8(a) and 8(b) show a modification of the embodiment shown in FIGS. 4(a) and 4(b). The modification is arranged to further speed up the focusing operation. In this case, when the difference signal C is within a range I or in a state of C11<C<C12 or C15<C<C16, the time interval TD is arranged to increase according as the absolute value of the difference signal C increases. When the absolute value of the difference signal C is large, the prediction value PE of the deviation degree ZE becomes large and a length of time TL required in driving the photo-taking lens also becomes long. Since the next performance of the focused state detecting operation cannot be started before completion of the photo-taking lens driving operation, it suffices to have the length of time TL as the minimum value of the time interval TD. Hence, a time interval TD6 can be shortened relative to a time interval TD3. Such arrangement permits the increase of the rate of recurrence of the focused state detecting operation and thus an increase of the response speed for focusing when the difference signal C is within the range I.

In the case of FIG. 8(b), the modification differs from FIG. 4(b) in that the prediction value PE is arranged to have the predicted value PE in a state of PE=0 when the difference value C is within a range II or in a state of C20<C<C21. This means that the position of the photo-taking lens is left unadjusted when it is within an allowable in-focus range. When the lens comes to the allowable range, the lens is no longer shifted to prevent occurrence of some vibration and also to prevent the electric energy from being wasted by an unnecessary driving operation.

What we claim:
1. A focusing device comprising:
 (a) light emitting means for projecting light onto an object to be photographed, said light emitting means performing a first cycle of light emission in response to a start signal of the focusing device;
 (b) light receiving means positioned to receive the reflection of the projected light of said light emitting means, said light receiving means having photosensitive elements provided with two light receiving areas;
 (c) means for measuring the degree of sharpness of an image of the object on the basis of the signals from said light receiving means, said measuring means converting the light of the first cycle incident on said two light receiving areas to electrical signals, obtaining the difference between the signals, and determining the degree of image sharpness by said signal difference; and
 (d) means for controlling said light emitting means, said means determining the time space from the first cycle of light emission of said light emitting means to the next cycle depending on the signal of said measuring means and actuating said light emitting means at the termination of duration of said time space.

2. A focusing device comprising:
 (a) light emitting means for projecting light onto an object to be photographed;
 (b) light receiving means for receiving the reflection of the projected light of said light emitting means;
 (c) means for detecting a focused state of an object image based on the signal from said light receiving means; and
 (d) light emission control means, said means receptive of a detection signal of said focused state detecting means controlling the light emission interval of said light emitting means, so that when said detection signal is far away from an in-focus region, said light emission interval is increased, and when it is close to the in-focus region, the light emission interval is shortened.

3. A focusing device according to claim 1 or 2, wherein said light emission control means includes a counter which is arranged to control the light emitting time interval of said light emitting means and to determine the light emitting time interval according to the signal from said focused state detecting means.

4. A focusing device comprising:
 (a) light emitting means for emitting light for the first time by a start signal of said focusing device and then recycling the light emitting operation;
 (b) means for driving motion of an image forming lens;
 (c) light receiving means having two light receiving areas to receive the reflection of said first cycle of light emission;
 (d) means for computing the difference between the photo signals from said two light receiving areas and sampling signals representing this difference;
 (e) means receptive of the output signal of said sampling meaas for detecting a focused state of an object image;
 (f) means receptive of the signal of said focused state detecting means for producing a count signal dependent on the focused state to determine the time space from the first cycle of light emission to the next cycle of light emission; and
 (g) means for controlling said lens drive means, said control means having gate means for controlling the current supply to said lens drive means and how long said gate means is gated off being controlled by the signal of said time interval determining means.

5. A focusing device comprising:
 (a) light emitting means for emitting light for the first time by a start signal of said focusing device and then recycling the light emitting operation;
 (b) means for driving motion of an image forming lens;
 (c) light receiving means having two light receiving areas to receive the reflection of said first cycle of light emission;
 (d) means for computing the difference between the photo signals from said two light receiving areas and sampling signals representing this difference;
 (e) means receptive of the output signal of said sampling means for detecting a focused state of an object image;
 (f) means receptive of the signal of said focused state detecting means for producing a count signal dependent on the focused state to determine the time space from the first cycle of light emission to the next cycle of light emission; and
 (g) means for controlling said lens drive means, said control means having a first comparing means receptive of the signal of said sampling meansfor discriminating whether the focused state is a far focus state of a near focus state, gating means for controlling the current supply to said lens drive means to be opened by the signal of said first comparing means, and a logic gate circuit being rendered operative by the signal from said time interval determining means to produce an output signal for closing said gating means.

* * * * *